US012585263B2

(12) United States Patent
Chou et al.

(10) Patent No.: US 12,585,263 B2
(45) Date of Patent: Mar. 24, 2026

(54) SYSTEMS AND METHODS FOR RECORDING EVENTS IN COMPUTING SYSTEMS

(71) Applicant: Quanta Computer Inc., Taoyuan City (TW)

(72) Inventors: Le-Sheng Chou, Taoyuan City (TW); Sz-Chin Shih, Taoyuan City (TW); Shuen-Hung Wang, Taoyuan City (TW); Hsien-Chang Li, Taoyuan City (TW)

(73) Assignee: Quanta Computer Inc., Taoyuan City (TW)

( * ) Notice: Subject to any disclaimer, the term of this patent is extended or adjusted under 35 U.S.C. 154(b) by 384 days.

(21) Appl. No.: 18/319,676

(22) Filed: May 18, 2023

(65) Prior Publication Data

US 2024/0385610 A1 Nov. 21, 2024

(51) Int. Cl.
*G05B 23/02* (2006.01)
(52) U.S. Cl.
CPC .............................. *G05B 23/0218* (2013.01)
(58) Field of Classification Search
CPC .................................................. G05B 23/0218
See application file for complete search history.

(56) References Cited

U.S. PATENT DOCUMENTS

| | | | |
|---|---|---|---|
| 10,884,469 B2 | 1/2021 | Lin et al. | |
| 11,074,102 B2 | 7/2021 | Ohta et al. | |
| 11,487,550 B1 * | 11/2022 | Bevis | ..................... G06F 13/20 |

| | | | |
|---|---|---|---|
| 2021/0042156 A1 * | 2/2021 | Rahardjo | ................ G06F 13/20 |
| 2021/0089106 A1 * | 3/2021 | Muccini | .................... G06F 1/30 |
| 2021/0311536 A1 * | 10/2021 | Messick | .................... G06F 1/28 |
| 2022/0066861 A1 * | 3/2022 | Tan | ...................... G06F 11/0751 |
| 2022/0350386 A1 * | 11/2022 | Cheng | ........................ G06F 1/28 |
| 2023/0122697 A1 * | 4/2023 | Maddukuri | ............. G06F 1/324 |

FOREIGN PATENT DOCUMENTS

| | | |
|---|---|---|
| CN | 112052108 A | 12/2020 |
| CN | 115460630 A | 12/2022 |
| TW | 200817887 A | 4/2008 |
| TW | 201728123 A | 8/2017 |
| TW | 201730763 A | 9/2017 |
| TW | 202011146 A | 3/2020 |

OTHER PUBLICATIONS

TW Office Action for Application No. 112125415, mailed Mar. 27, 2024, w/ First Office Action Summary, 5 pp.
TW Search Report for Application No. 112125415, mailed Mar. 27, 2024, w/ First Office Action, 1 p.

* cited by examiner

*Primary Examiner* — Bryce P Bonzo
*Assistant Examiner* — Xinyuan Yu
(74) *Attorney, Agent, or Firm* — NIXON PEABODY LLP

(57) ABSTRACT

A computing system includes one or more electronic components, a first programmable device, and a baseboard management controller (BMC). The first programmable device is communicatively coupled to a first subset of the one or more electronic components. The first programmable device is configured to detect event activities associated with the first subset and to store the event activities as stored first event data. The BMC includes a system event log. The BMC is communicatively coupled to the first programmable device. The BMC is configured to receive the stored first event data and to write the stored first event data in the system event log.

21 Claims, 6 Drawing Sheets

| | |
|---|---|
| Detect event failure | 402 |
| Store event failure data in an internal memory | 404 |
| Provide event failure data to BMC | 406 |
| Store event failure data in SEL storage | 408 |
| Receive signal indicating event failure data recordation | 410 |
| Clear the stored event failure data from the internal memory | 412 |

SYSTEMS AND METHODS FOR RECORDING EVENTS IN COMPUTING SYSTEMS

FIELD OF THE INVENTION

The present invention relates generally to capturing and storing computing system critical events, and more specifically, to systems and methods for capturing computing system critical events using programmable devices prior to storing these system critical events on the computing system.

BACKGROUND OF THE INVENTION

Computing systems (e.g., servers) are employed in large numbers for high demand applications, such as network-based systems or data centers. The emergence of cloud computing applications has increased the demand for data centers. Data centers have numerous servers that store data and run applications accessed by remotely-connected computer device users. A typical data center has physical rack structures with attendant power and communication connections. Each rack may hold multiple computing servers and storage servers. Each server generally includes hardware components such as processors, memory devices, network interface cards, power supplies, and other specialized hardware. Servers generally include a baseboard management controller (BMC) that manages the operation of hardware components as well as support components such as power supplies and fans. The BMC also communicates operational data to a central management station that manages the servers of the rack through a network. Downtime of data centers or computing systems within data centers is a concern. The present disclosure provides solutions that at least reduce concerns surrounding downtime or provide solutions that can enhance debugging efforts surrounding any potential downtime.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a computing system includes one or more electronic components, a first programmable device, and a baseboard management controller (BMC). The first programmable device is communicatively coupled to a first subset of the one or more electronic components. The first programmable device is configured to detect event activities associated with the first subset and store the event activities as stored first event data. The BMC includes a system event log. The BMC is communicatively coupled to the first programmable device. The BMC is configured to receive the stored first event data and write the stored first event data in the system event log.

In some implementations, the first programmable device is a field programmable gate array (FPGA) or a complex programmable logic device (CPLD). In some implementations, the one or more electronic components includes a processor, a voltage regulator, a storage device, a network interface card, or any combination thereof. In some implementations, the BMC is further configured to provide a clear signal to the first programmable device to clear the stored first event data from the programmable device. In some implementations, the first programmable device and the BMC are communicatively coupled via an inter-integrated circuit ($I^2C$) protocol.

In some implementations, the computing system further includes a second programmable device communicatively coupled to a second subset of the one or more electronic components. The second subset of the one or more electronic components includes different electronic components than the first subset of the one or more electronic components. The second programmable device is configured to detect event failures associated with the second subset of the one or more electronic components and store the event failures as stored second event data. The BMC is communicatively coupled to the second programmable device, and the BMC is configured to receive the stored second event data and store the stored second event data in the system event log. In some implementations, the BMC further includes a decoder configured to select between event information received from the first programmable device and the second programmable device and direct the event information to the system event log. In some implementations, the first programmable device and the second programmable device are located on different circuit boards of the computing system.

In some implementations, the first programmable device is further configured to monitor power gating on the first subset and to store information associated with the power gating as the stored first event data. In some implementations, the first programmable device is further configured to send the stored information associated with the power gating to the BMC and to receive, from the BMC, a clear signal to release the stored first event data.

According to certain aspects of the present disclosure, a method for storing event activity data in a system event log of a computing system includes monitoring, by a first programmable device of the computing system, event activities associated with a first subset of one or more electronic components of the computing system. The first programmable device stores the event activities as stored first event data. The first programmable device sends the stored first event data to a baseboard management controller (BMC) of the computing system such that the BMC records the stored first event data in the system event log.

In some implementations, the first programmable device receives, from the BMC, a clear signal and deletes the stored first event data. In some implementations, the first programmable device is a field programmable gate array or a complex programmable logic device. In some implementations, the one or more electronic components includes a processor, a voltage regulator, a storage device, a network interface card, or any combination thereof. In some implementations, the first programmable device and the BMC are communicatively coupled via an inter-integrated circuit ($I^2C$) protocol.

In some implementations, a second programmable device of the computing system monitors event activities associated with a second subset of the one or more electronic components. The second subset of the one or more electronic components includes different electronic components than the first subset of the one or more electronic components. The second programmable device stores the event activities associated with the second subset as stored second event data. The second programmable device sends the stored second event data to the BMC such that the BMC records the stored second event data in the system event log. In some implementations, a decoder of the BMC directs event information received from one or more of the first programmable device and the second programmable device to the system event log. In some implementations, the stored first event data includes power gating information on the first subset of the one or more electronic components. In some implementations, the first programmable device receives from the BMC a clear signal to delete the power gating information from the first programmable device. In some implementations, the first programmable device and the second programmable device are located on different circuit boards of the computing system.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

DETAILED DESCRIPTION

Figure 1:
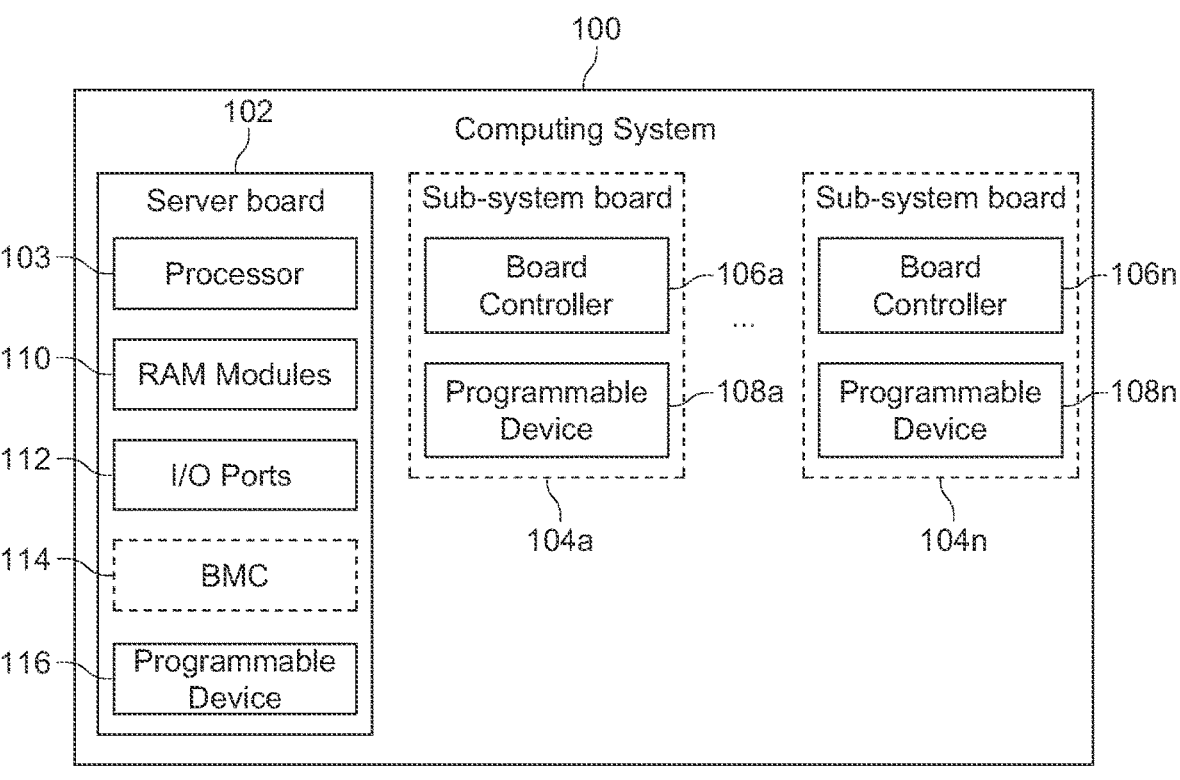
FIG. 1 is a block diagram of a computing system, according to certain aspects of the present disclosure.

In modern servers and/or computing systems, system critical events may not be stored for various reasons. System critical events for a computing system are typically recorded on system event logs and used for system management, debugging, and other purposes. The baseband management controller (BMC) is typically involved in recording system event logs for datacenter system management. However, the BMC is limited by the number of general-purpose input/output (GPIO) pins available for receiving system critical events from various components on the computing system. Furthermore, the BMC can also be limited by workload and latency associated with activities of the BMC. Additionally, interaction between the BMC and other microcontroller units can affect whether the system critical events are communicated properly to the BMC. Thus, system event logs may be lost or may not be received on-time by the BMC. Due to a limited number of GPIO pins, the BMC may only be able to monitor a few system event logs at a time. Therefore, the present disclosure provides a programmable device for capturing and temporarily storing system event logs such that these system event logs can be later provided to the BMC.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Referring to FIG. 1, a block diagram of components of a computing system 100 is provided. The computing system 100 can be a server, but any suitable computer device can incorporate the principles disclosed herein. The computing system 100 includes a server board 102. The server board 102 is one or more circuit boards. For example, the server board 102 can be one motherboard or multiple motherboards interconnected with one or more communication cables. Installed on the server board 102 is a processor 103, one or more read access memory (RAM) modules 110, a BMC 114, and/or input-output (I/O) ports 112.

Although one of each of the components of the computing system 100 is shown in FIG. 1, the computing system 100 can support more than one of each of these components. For example, the processor 103 can represent one or more central processing units (CPUs) (e.g., two CPUs, three CPUs, four CPUs, six CPUs, etc.). The processor 103 can represent one or more graphics processing units (GPUs) (e.g., two GPUs, three GPUs, four GPUs, etc.). The processor 103 can represent combinations of CPUs and GPUs. Similarly, the RAM modules 110 can represent one or more RAM modules (e.g., multiple dual in-line memory modules (DIMMs), for example, one DIMM, two DIMMs, four DIMMs, eight DIMMs, etc.).

The processor 103 has access to the RAM modules 110. The processor 103 can be communicatively coupled to a platform controller hub or a chipset of the server board 102. The chipset of the server board 102 can provide access to communication standards such as serial advanced technology attachment (SATA) devices, peripheral component interconnect express (PCIe) devices, network interface cards (NICs), redundant array of inexpensive disks (RAID) cards, small computer system interface (SCSI) interface, field programmable gate array (FPGA) cards, GPUs, etc.

In some implementations, GPUs and/or video interfaces provided by the processor 103 allow a monitor or screen to connect to the server board 102. Video processing and secondary memory access (e.g., the RAM modules 110) typically require high speed operation and access to the processor 103, hence can be connected to the processor 103 without having to go through the chipset of the server board 102.

In some implementations, the computing system 100 includes one or more sub-system boards 104a, . . . , 104n. The one or more sub-system boards 104a, . . . , 104n can include a board controller 106a, . . . , 106n and a programmable device 108a, . . . , 108n. The one or more sub-system boards 104a, . . . , 104n includes a PCIe card, GPU card, M.2 card, a nonvolatile memory express (NVMe) device, E1S device, a storage sub-system, and/or an accelerated graphics port (AGP) card. In some implementations, the sub-system board 104a is a PCIe card or an AGP card, and the board controller 106a is a GPU. In some implementations, the sub-system board 104a is an NVMe and the board controller 106a is a PCIe switch. In some implementations, the sub-system board 104a is a storage sub-system and the board controller 106a is a serial attached SCSI (SAS) expander. Other examples of board controllers 106a, . . . , 106n include storage controllers, PCIe switch IC, GPU modules, SAS expander, etc.

From a high level, the I/O ports 112 represent any one of these interfaces for allowing input and/or output devices to interface with the computing system 100. For example, the I/O ports 112 can represent a universal serial bus (USB) port that supports, for example, USB4, USB 3.2, USB 3.1, USB 3.0, USB 2.0, etc. The I/O ports 112 can represent NIC ports that support wired interfaces such as Ethernet or wireless interfaces such as Bluetooth®, Wi-Fi, etc. The I/O ports 112 can represent other ports such as HDMI ports, headphone jacks, external SATA (eSATA), etc. In some implementations, some ports within the I/O ports 112 are coupled to the processor 103 (e.g., coupled to a CPU through a GPU). That is, the GPU includes ports (e.g., USB-C ports, HDMI ports, etc.) and information from these ports can be relayed by the GPU to the CPU. In some implementations, some ports within the I/O ports 112 go through the chipset of the server board 102 (e.g., Ethernet ports, headphone jacks, keyboard interfaces, mouse interfaces, parallel ports, serial ports, USB 3.0 ports, etc.).

The BMC 114 is a specialized controller (or processor) for managing operations of the computing system 100. In some implementations, the BMC 114 enables remote monitoring of the computing system 100, having communication channels to different components of the computing system 100. For example, the BMC 114 can allow remote monitoring of fan speeds, temperature sensors, hard drive faults, power supply failures, operating system faults, etc. The BMC 114 can include internal temporary cache memory that facilitates the BMC 114 processing of machine-readable instructions. The BMC 114 records system event logs to facilitate system management of the computing system 100. Example BMCs include ASPEED AST2300, AST2400, AST2500, AST2600, etc. The BMC 114 can be provided on the server board 102 or can be provided on one of the sub-system boards 104a, . . . , 104n. In those implementations, the BMC 114 can be one of the board controllers 106a, . . . , 106n.

The server board 102 further includes a programmable device 116. The programmable devices 108a, . . . , 108n and 116 are field programmable gate arrays (FPGAs) and/or a complex programmable logic devices (CPLDs). In some implementations, the programmable devices 108a, . . . , 108n and 116 are responsible for controlling voltage regulators' power-on timing, device initialization, and/or hardware control of the computing system 100.

Figure 2:
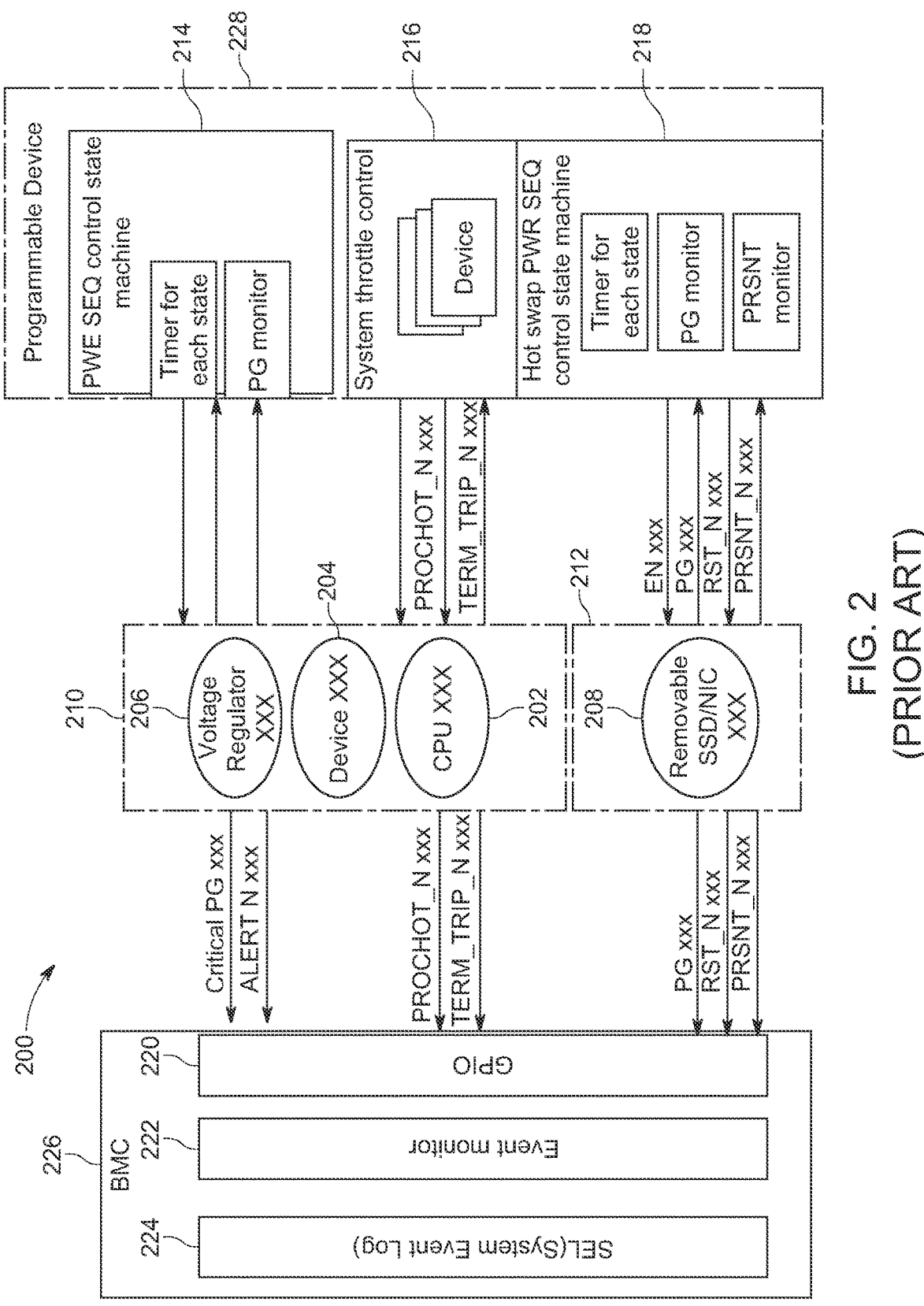
FIG. 2 is a block diagram of an event logging system in the prior art.

Referring to FIG. 2, an event logging system 200 among a programmable device 228, a first component grouping 210, a second component grouping 212, and a BMC 226 is provided in the prior art. A component grouping includes one or more electronic components or devices of a computing system. Components within a component grouping can be spread across different circuit boards (e.g., spread across different server boards, sub-system boards, etc.). In an example, both the first component grouping 210 and the second component grouping 212 can be provided on a server board (e.g., the server board 102). Alternatively, the first component grouping 210 can be provided on the server board and the second component grouping 212 can be provided on a sub-system board (e.g., the sub-system board 104a). The BMC 226 stores system event logs in a system event log (SEL) storage 224. The BMC 226 includes an event monitor 222 that receives events and stores these events in the SEL storage 224. The BMC 226 further includes GPIO 220 with a limited number of pins for receiving data associated with one or more events to be stored in the SEL storage.

The first component grouping 210 and the second component grouping 212 provide events to the GPIO 220 of the BMC 226 as events arise. For example, the first component grouping 210 can include one or more components, e.g., a voltage regulator XXX 206, a device XXX 204, and a CPU XXX 202. Events from these components are provided as "CriticalPGxxx", "ALERT_Nxxx", "PROCHOT_Nxxx" and "TERM_TRIP_Nxxx." The GPIO 220 has a limited number of pins, thus certain important signals are selected for sending to the BMC 226, limiting the number of signals that can be monitored by the BMC 226. In the different signals "_N" indicates the signal is an active low signal, and "xxx" is a distinguishing indicator for a specific component or device. "CriticalPGxxx" indicates Critical Power Good and can describe, for example, whether the power on a CPU of a motherboard is functioning properly. "ALERT_Nxxx" is a signal that is asserted to inform the BMC 226 when an error or an event has occurred. "PROCHOT_Nxxx" indicates Processor Hot and is asserted in situations where a CPU's power regulator overheats or is found to draw current above a current threshold. The "PROCHOT_Nxxx" signal can be used to trigger a throttling or a capping of the power to the CPU in order to cool the CPU. "TERM_TRIP_Nxxx" indicates Terminal Trip signal and describes a signal that is asserted when a controller's internal temperature sensor is close to a temperature threshold that can damage the controller. The "TERM_TRIP_Nxxx" can be provided to trigger a computing system shutdown to protect the dangerously heated component.

The second component grouping 212 can include one or more components, e.g., a removable solid state drive (SSD) and/or a removable network interface card (NIC) (i.e., removable SSD/NIC XXX 208). Example events from the removable SSD/NIC XXX 208 provided to the BMC 226 can include "PGxxx", "RST_Nxxx", and "PRSNT_Nxxx." "PGxxx" is a Power Good signal; for example, for common hot plug designs, "PGxxx" is used for power sequence control and monitoring status of electronic fuses. "RST_Nxxx" is a Device Reset signal that is used to initialize a device (e.g., the removable SSD/NIC XXX 208) to follow sequence requirements after a hot-plug event. "PRSNT_Nxxx" is a signal that allows the programmable device 228 to know whether the device is present. "PRSNT_Nxxx" can be used for detecting hot plug events and handling corresponding sequence for the hot plug device.

The programmable device 228 is similar to the programmable device 116. The programmable device 228 interacts with the first component grouping 210 and the second component grouping 212. The programmable device 228 controls power-on timing of the voltage regulator XXX 206 via the power sequence control state machine 214. The programmable device 228 also monitors power gating via the power sequence control state machine 214. Components or devices in the first and second component groupings 210, 212 follow the power sequence timing rules provided in component or device specifications. Thus, the programmable device 228 turns on components' power rails step by step, as indicated in the specifications. The programmable device 228 can also initiate shutdown procedures when a related voltage rail hits an abnormal behavior (e.g., Power Good signal runtime drop or Timeout after the programmable device 228 tries to enable the voltage rail in sequence as provided in the specification). The programmable device 228 manages throttling of system components using the system throttle control 216 (e.g., using the "PRO-CHOT_Nxxx" signal as described above). The programmable device 228 manages operation of the removable SSD/NIC XXX 208 via a hot swap power sequence control state machine 218.

As provided in FIG. 2, the event logging system 200 of the prior art is limited by the number of pins of the GPIO 220 of the BMC 226. Event information or event data collected can be limited, thus only the most critical or only system critical events are prioritized to be sent to the BMC 226. The first component grouping 210 and the second component grouping 212 directly provide event information or event data to the BMC 226. The BMC 226 performs multiple tasks, and sometimes if the BMC 226 is busy, event information or event data provided to the BMC 226 can be lost.

Figure 3:
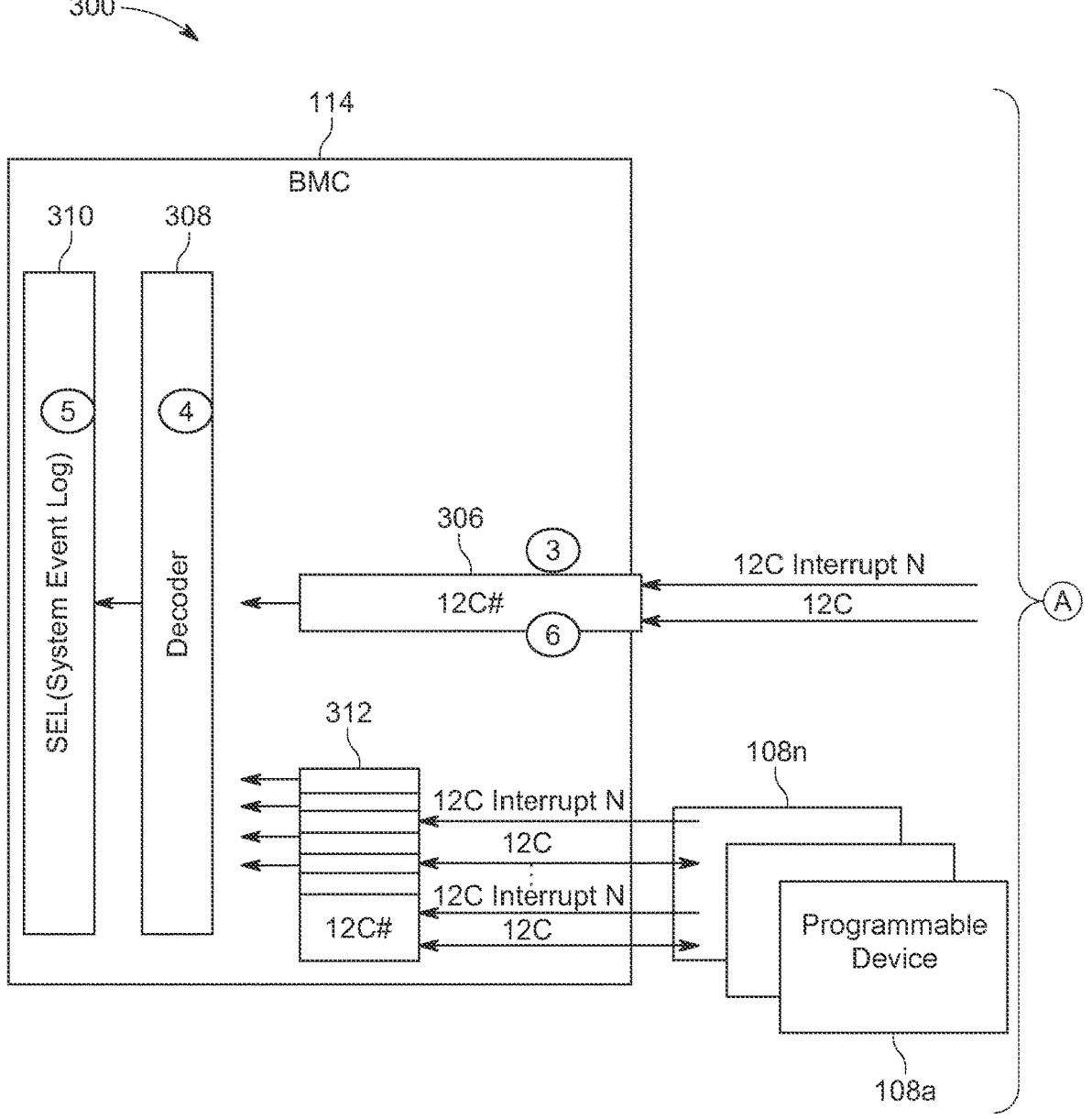
FIG. 3 is a block diagram of an event logging system, according to certain aspects of the present disclosure.
Figure 3:
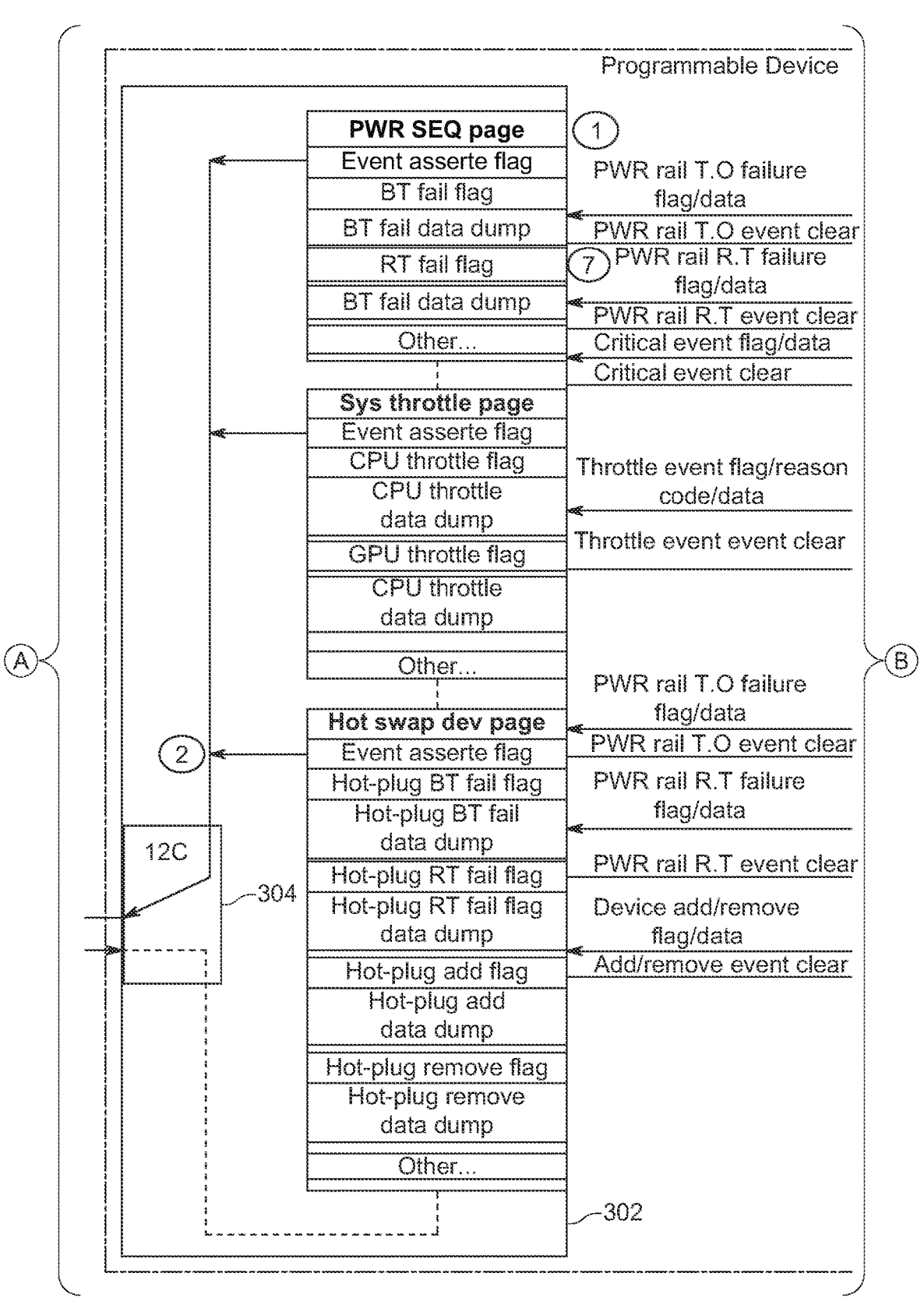
Figure 3:
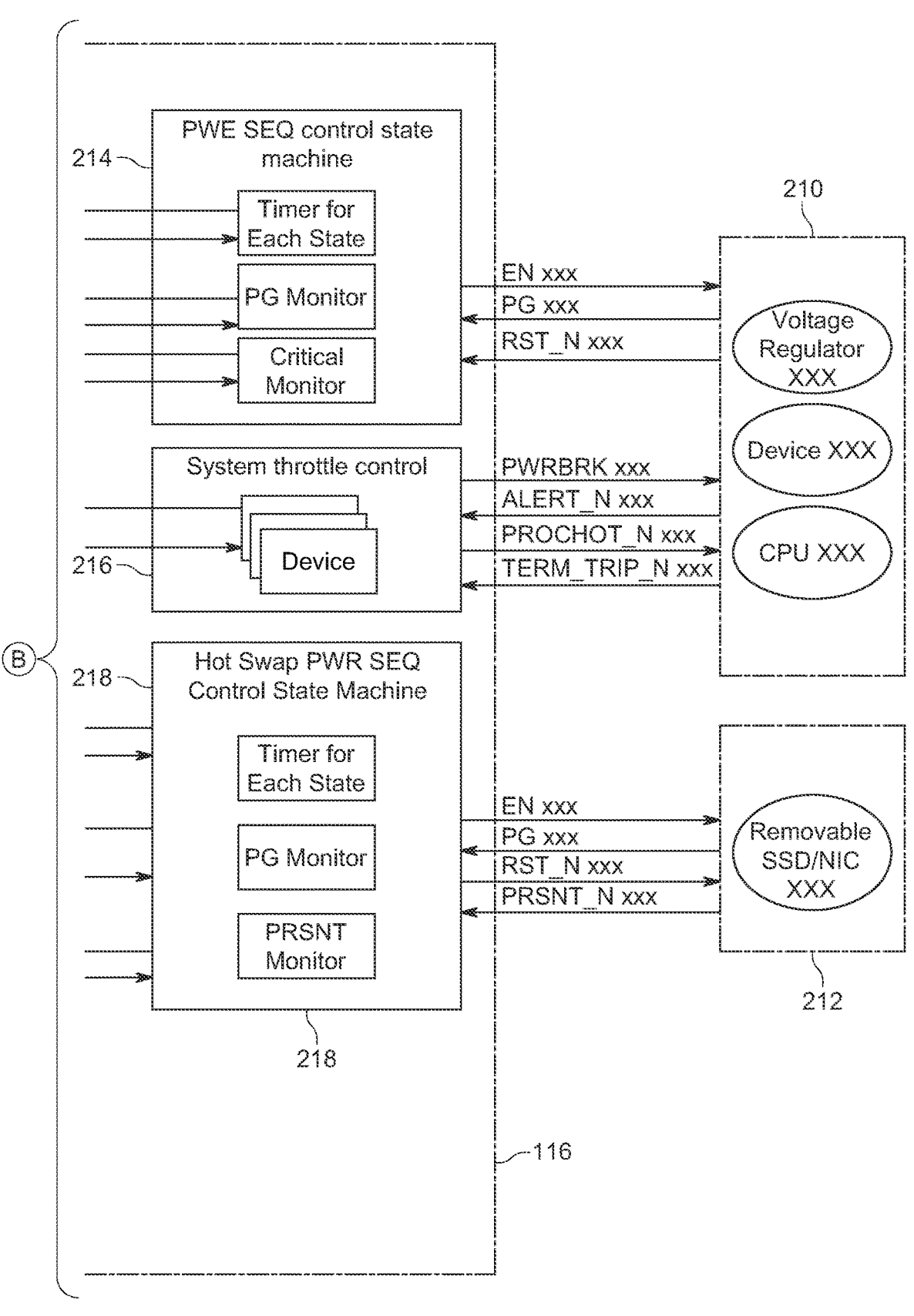

Referring to FIG. 3, an event logging system 300 among the programmable device 116, the programmable devices 108a, . . . , 108n, the first component grouping 210, the second component grouping 212, and the BMC 114 is provided, according to some implementations of the present disclosure. The event logging system 300 is an improvement over the event logging system 200. For example, the BMC 114 is equipped with a different communication interface (e.g., an inter-integrated circuit (I²C) interface 306 that supports the I2C protocol). By using the I2C protocol with the programmable device 116, the BMC 114 does not have a pin-count bottleneck compared to the BMC 226. Thus, more event signals can be monitored by the event logging system 300 compared to the event logging system 200. Event information being monitored need not be the most crucial or the system critical events. Furthermore, workload or latency associated with the BMC 114 does not affect event information storage because the BMC 114 can retrieve stored event information or stored event data from the programmable device 116 when the BMC 114 is no longer busy.

In the event logging system 300, the programmable device 116 monitors event activity in the first component grouping 210 and the second component grouping 212. The programmable device 116 can also control sequences associated with the operation of one or more electronic components of the first component grouping 210 and the second component grouping 212. In some implementations, a first subset of the one or more electronic components can reside on a first circuit board (e.g., the server board 102), and a second subset of the one or more electronic components can reside on a second circuit board (e.g., the sub-system board 104a). In an example, the first subset includes a CPU and a voltage regulator, and the second subset includes a removable SSD/NIC.

In the event logging system 300, more event information can be monitored compared to the event logging system 200. The programmable device 116 can provide one or more enable signals "EN_xxx" and one or more reset signals "RST_Nxxx." The programmable device 116 can provide "PWRBRKxxx" and "PROCHOT_Nxxx" signals and receive "ALERT_Nxxx" and "TERM_TRIP_Nxxx" signals. "PWRBRKxxx" is a signal that is issued to a PCIe device to initiate an emergency power reduction mechanism.

The programmable device 116 includes internal storage 302. The internal storage 302 stores information associated with the event activity monitored by the programmable device 116. In some implementations, the power sequence control state machine 214 can store information related to power events associated with the first component grouping 210. The internal storage 302 can store event information associated with power sequence. For example, a power sequence event asserted flag, a BT fail flag, a BT fail data dump, an RT fail flag, an RT fail data dump, etc., can be stored. The power sequence control state machine 214 can set the different flags based on the monitored data. The internal storage 302 can store event information associated with system throttling. For example, a system throttle event asserted flag, a CPU throttle flag, a CPU data dump, a GPU throttle flag, a GPU throttle data dump, etc., can be stored. The system throttle control 216 can set the different throttle event flags based on the monitored data. The internal storage 302 can store event information associated with hot swapping. For example, a hot swap event asserted flag, a hot-plug BT fail flag, a hot-plug BT fail data dump, a hot-plug RT fail flag, a hot-plug RT fail flag data dump, a hot-plug add flag, a hot-plug add data dump, a hot-plug remove flag, a hot-plug remove data dump, etc., can be stored. The hot swap power sequence control state machine 218 can set the different hot-swap flags based on the monitored data.

The event asserted flags (e.g., the power sequence event asserted flag, the system throttle event asserted flag, the hot-swap event asserted flag, etc.) can be used to control (a) a communication interface 304 of the programmable device 116 and/or (b) a timing for communicating stored events to the BMC 114. The communication interface 304 can support the I2C communication protocol. The event asserted flags or the different flags stored in the internal storage 302 can indicate to the communication interface 304 that event data or event information has been received and is ready for communicating to the BMC 114. That is, when a flag is asserted, the programmable device 116 asserts interrupt GPIO signals that inform the BMC 114 that event data or event information is ready for communication. The BMC 114 will then use I2C communication protocol to gather event information or error information from the programmable device 116. The programmable devices 108*a*, . . . , 108*n* have similar components and operate in a similar manner compared to the programmable device 116.

The BMC 114 can include a communication interface 306 that supports a similar protocol as the communication interface 304. The communication interface 306 can support I2C protocol. The communication interface 306 is similar to or the same as communication interfaces 312. The communication interface 304 is provided for communicating with the communication interface 306. The communication interfaces 312 are provided for communicating with the programmable devices 108*a*, . . . , 108*n*. The BMC 114 includes a decoder 308 that selects output of one of the communication interfaces 306, 312 to store in a system event log (SEL) storage 310.

The communication interfaces 304, 306, and 312 allow bidirectional communication. Thus, after the event data is stored in or written to the SEL storage 310, the BMC 114 can provide a clear signal to the programmable device 116 to clear event data stored in the internal storage 302 that has been written to the SEL storage 310. The power sequence control state machine 214, the system throttle control 216, and/or the hot swap power sequence control state machine 218 can de-assert flags and delete stored information in the internal storage 302.

Figure 4:
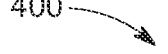
FIG. 4 illustrates a process for storing event information in a system event log, according to certain aspects of the present disclosure.
Figure 4:
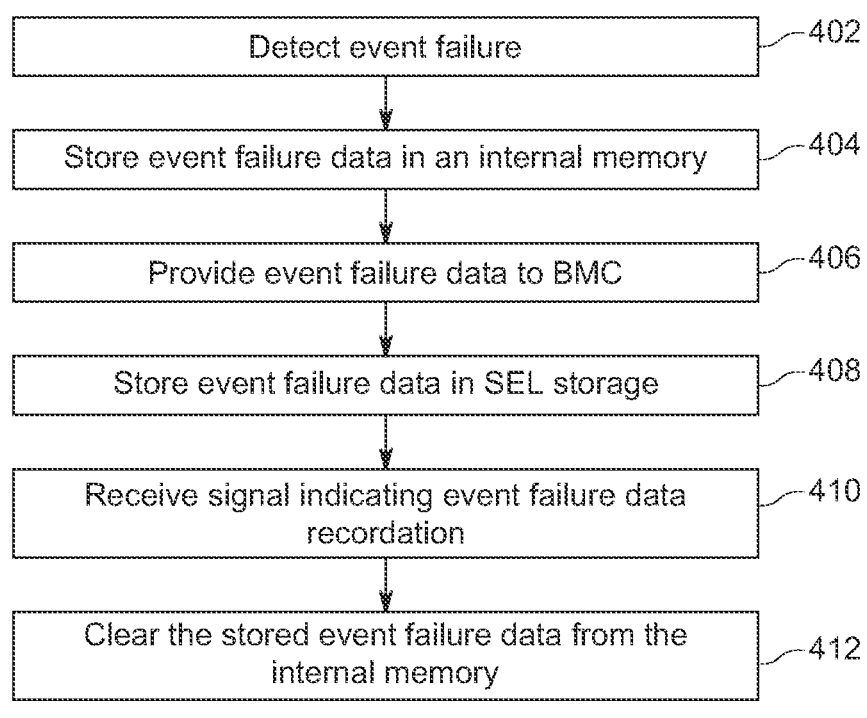

Referring to FIG. 4, a process 400 for storing event information in the system event log storage 310 is provided, according to certain aspects of the present disclosure. The process 400 is performed by the computing system 100, and more specifically, by the event logging system 300. At step 402, the event logging system 300 detects an event failure. In an implementation, the programmable device 116 (FIG. 3) detects an event failure. For example, the power sequence control state machine 214 determines a power rail timeout (T.O.) failure has occurred and asserts the power rail T.O. failure flag, determines a power rail runtime (R.T.) failure has occurred and asserts the power R.T. failure flag, determines a critical event error has occurred and asserts the critical event flag, etc.

At step 404, the event logging system 300 stores event failure data in the internal storage 302. That is, data associated with any asserted flag is stored as a data dump in the internal storage 302.

In an example, the computing system 100 encounters a boot-up error. The programmable device 116 at indicia 1 (FIG. 3), PWR Error Type Flags, e.g., BT: Boot-UP Error is asserted. Data associated with the PWR Error Type Flags is stored in the internal storage 302. The programmable device 116 at indicia 2 (FIG. 3) provides an interrupt signal to the BMC 114 to inform the BMC 114 that the computing system 100 has encountered the boot-up error.

At step 406, the event logging system 300 provides event failure data to the BMC 114, and at step 408, the BMC 114 stores the event failure data in the SEL storage 310. In the boot-up error example, the BMC 114 receives the interrupt signal and accesses the internal storage 302 of the programmable device 116. In some implementations, the BMC 114 checks each section of the internal storage 302 to determine which flags are asserted. In some implementations, the internal storage 302 is arranged in sections or pages. For example, the internal storage 302 can have a power sequence page, a system throttle page, a hot swap page, etc. The section or page arrangement allows for nested searches. For example, in the boot-up error example, using the I2C protocol, the BMC 114 checks the power sequence page to determine whether a power sequence event flag is asserted, the system throttle page to determine whether a system throttle event flag is asserted, and the hot swap development page to determine whether a hot swap event flag is asserted. The BMC 114 will find that only the power sequence event flag is asserted and the other event flags are not asserted, thus, the BMC 114 knows to only search for data organized under the power sequence page.

When the BMC 114 determines that the power sequence event flag is asserted, then the BMC 114 searches which flags under the power sequence page are asserted. For example, the BMC 114 can determine that the BT: Boot-Up Error flag is asserted, the RT: Run-Time Error flag is not asserted. In some implementations, the BT: Boot-Up Error flag indicates that a power rail is not up and can identify which power rail is not up along with the power state code associated with where the power failure occurred during boot-up.

At indicia 4 (FIG. 3), the BMC 114 gets event data from the internal storage 302, for example, the BT fail data dump, and at indicia 5 (FIG. 3) stores the data in the appropriate location in the SEL storage 310 using the decoder 308. The SEL storage 310 can be organized in a manner such that the decoder 308 can store information in appropriate locations within the SEL storage 310 allocated for certain types of errors or event information. In some implementations, the BT fail data dump includes the power state code where the boot-up failed and which power rail did not go up during boot-up.

At step 410, the programmable device 116 receives a clear event signal indicating that the event failure data has been recorded in the SEL storage 310. At indicia 6 (FIG. 3), the BMC 114 provides a clear event command to the programmable device 116. For example, the clear event command can indicate that the BT fail data dump should be deleted.

At step 412, the programmable device 116 clears the stored event failure data from the internal storage 302. In the boot-up example, the BT fail data dump is removed from the internal storage 302.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A computing system comprising:
one or more electronic components;
a first programmable device communicatively coupled to a first subset of the one or more electronic components, the first programmable device configured to detect event activities associated with the first subset and store the event activities as stored first event data; and
a baseboard management controller (BMC) including a system event log, the BMC being communicatively coupled to the first programmable device, the BMC being configured to receive the stored first event data and to store the first event data in the system event log;
wherein the first programmable device is further configured to monitor power gating on the first subset and to store information associated with the power gating as the stored first event data.

2. The computing system of claim 1, wherein the first programmable device is a field programmable gate array or a complex programmable logic device.

3. The computing system of claim 1, wherein the one or more electronic components includes a processor, a voltage regulator, a storage device, a network interface card, or any combination thereof.

4. The computing system of claim 1, wherein the BMC is further configured to provide a clear signal to the first programmable device to clear the stored first event data from the programmable device.

5. The computing system of claim 1, wherein the first programmable device and the BMC are communicatively coupled via an inter-integrated circuit protocol.

6. The computing system of claim 1, further comprising:
a second programmable device communicatively coupled to a second subset of the one or more electronic components, the second subset including different electronic components than the first subset;
wherein the second programmable device is configured to detect event failures associated with the second subset and store the event failures as stored second event data; and
wherein the BMC is communicatively coupled to the second programmable device, the BMC being configured to receive the stored second event data and to store the stored second event data in the system event log.

7. The computing system of claim 6, wherein the BMC further includes a decoder configured to select between event information received from the first programmable device and the second programmable device and to direct the event information to the system event log.

8. The computing system of claim 6, wherein the first programmable device and the second programmable device are located on different circuit boards of the computing system.

9. The computing system of claim 1, wherein the first programmable device is further configured to send the stored information associated with the power gating to the BMC and to receive, from the BMC, a clear signal to release the stored first event data.

10. A method for storing event activity data in a system event log of a computing system, the method comprising:
monitoring, by a first programmable device of the computing system, event activities associated with a first subset of one or more electronic components of the computing system;
storing, by the first programmable device, the event activities as stored first event data;

sending, by the first programmable device, the stored first event data to a baseboard management controller (BMC) of the computing system such that the BMC records the stored first event data in the system event log;
monitoring, by a second programmable device of the computing system, event activities associated with a second subset of the one or more electronic components, the second subset including different electronic components than the first subset of the one or more electronic components;
storing, by the second programmable device, the event activities associated with the second subset as stored second event data; and
sending, by the second programmable device, the stored second event data to the BMC such that the BMC records the stored second event data in the system event log.

11. The method of claim 10, further comprising:
receiving, by the first programmable device from the BMC, a clear signal; and
deleting, by the first programmable device, the stored first event data.

12. The method of claim 10, wherein the first programmable device is a field programmable gate array or a complex programmable logic device.

13. The method of claim 10, wherein the one or more electronic components includes a processor, a voltage regulator, a storage device, a network interface card, or any combination thereof.

14. The method of claim 10, wherein the first programmable device and the BMC are communicatively coupled via an inter-integrated circuit protocol.

15. The method of claim 10, further comprising:
directing, by a decoder of the BMC, event information received from one or more of the first programmable device and the second programmable device to the system event log.

16. The method of claim 10, wherein the stored first event data includes power gating information on the first subset.

17. The method of claim 16, further comprising:
receiving, by the first programmable device from the BMC, a clear signal to delete the power gating information from the first programmable device.

18. The method of claim 10, wherein the first programmable device and the second programmable device are located on different circuit boards of the computing system.

19. A computing system comprising:
one or more electronic components;
a first programmable device communicatively coupled to a first subset of the one or more electronic components, the first programmable device configured to detect event activities associated with the first subset and store the event activities as stored first event data;
a baseboard management controller (BMC) including a system event log, the BMC being communicatively coupled to the first programmable device, the BMC being configured to receive the stored first event data and to store the first event data in the system event log; and
a second programmable device communicatively coupled to a second subset of the one or more electronic components, the second subset including different electronic components than the first subset;

wherein the second programmable device is configured to detect event failures associated with the second subset and store the event failures as stored second event data; and wherein the BMC is communicatively coupled to the second programmable device, the BMC being configured to receive the stored second event data and to store the stored second event data in the system event log.

20. The computing system of claim 19, wherein the BMC further includes a decoder configured to select between event information received from the first programmable device and the second programmable device and to direct the event information to the system event log.

21. The computing system of claim 19, wherein the first programmable device and the second programmable device are located on different circuit boards of the computing system.

\* \* \* \* \*